C. F. WHORF.

RAILROAD CAR HEATER AND VENTILATOR.

No. 7,088. Reissued May 2, 1876.

WITNESSES.

John H. Collins

Wm. S. Stewart

INVENTOR.

Chas. F. Whorf

By Chas. D. Moody atty.

N. PETERS, PHOTO-LITHOGRAPHER, WASHINGTON, D. C.

UNITED STATES PATENT OFFICE.

CHARLES F. WHORF, OF ST. LOUIS, MISSOURI.

IMPROVEMENT IN RAILROAD-CAR HEATERS AND VENTILATORS.

Specification forming part of Letters Patent No. 138,062, dated April 22, 1873; reissue No. 7,088, dated May 2, 1876; application filed February 7, 1876.

*To all whom it may concern:*

Be it known that I, CHARLES F. WHORF, a resident of the city and county of St. Louis, State of Missouri, have invented new and useful Improvements in Heaters and Ventilators, of which the following is a full, clear, and exact description, reference being had to the annexed drawing, making part of this specification, in which—

Figure 1:
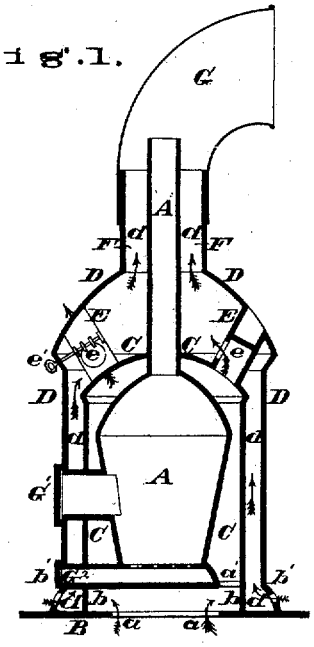
Figure 3:
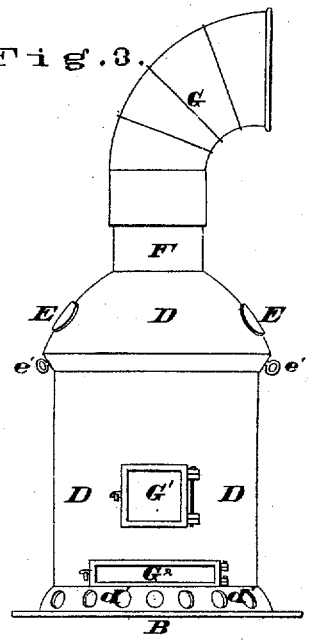
Figure 2:
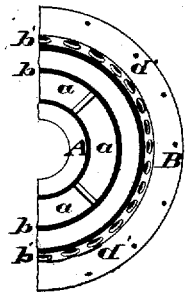
Figure 4:
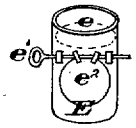

Figure 1 is a central sectional elevation; Fig. 2, a horizontal section (in part) taken on a line above the base; Fig. 3, a front elevation; and Fig. 4, a detail, showing the damper arrangement.

Like letters indicate like parts.

The present invention relates to an improved method and means for heating and ventilating railway-cars, steamboats, vessels, public and private buildings, hot-houses, conservatories, and similar places.

Considered generally, the invention embraces the following elements in combination: First, a heater or furnace of any suitable description; second, a hot-air chamber; and, third, a ventilating-chamber. The two latter are in the immediate vicinity of the former, and heated thereby, and, in consequence, ascending air-currents induced therein. Pure air from without the apartment or building is drawn into the hot-air chamber, and, after being heated therein, is delivered into the apartment or building for the purpose of heating it. At the same time the foul or cooler air of the apartment or building is drawn into the ventilating-chamber, where, being heated, it rises, and thence, through a ventilating-shaft, is discharged outside the apartment or building.

The invention may be located either directly in the apartment to be heated and ventilated, as in the case of a car or a single apartment, or it may, like an ordinary furnace, be placed outside the apartment, and, in such case, suitable connections are made with the apartment, by which the pure warm air from the hot-air chamber is delivered into the apartment, and the foul or cooler air is drawn from the apartment into the ventilating-chamber.

In carrying out my invention a preferable construction and arrangement are as follows: Referring to the accompanying drawing, A represents a suitable heater or furnace. A′ represents the smoke stack or pipe. C represents a casing, surrounding the heater, and inclosing a space around the heater, which I term the hot-air chamber. D represents another larger casing, arranged concentrically with the casing C, and inclosing a space, *d*, between the two casings, which I term the ventilating-chamber. B represents a base, supporting the heater and casings. It is provided with an inner rim, *b*, and an outer rim, *b′*. The outer casing D rests upon and connects with the outer rim *b′*, and the inner casing C rests upon and connects with the inner rim *b*. The back of the heater is stayed or supported in any suitable manner. The parts are arranged to provide a space beneath the heater connecting with the hot-air chamber, as shown in Fig. 1.

In the bottom of the vase B are arranged openings *a a*, through which air from without the apartment or building is admitted to the hot-air chamber. The outer rim $b^1$ of the base is perforated at *d d*, &c., to establish a communication between the apartment or building and the ventilating-chamber *d*. E E represent tubes or pipes leading from the hot-air chamber, through the ventilating chamber, to the apartment or apartments being warmed. The tubes are provided with dampers *e e*, Figs. 1 and 4, operated by rods $e^1$ $e^1$ and arranged to close, when it is desired, the tubes E E and open passages $e^2$ $e^2$ in the sides of the tubes, and put the hot-air chamber in connection with the ventilating-chamber instead of with the apartment or building. F represents the shaft through which the air from the ventilating-chamber is discharged to the open air. G represents a ventilating cowl placed on top of the shaft F and above the roof of the car or building, and constructed to turn suitably with reference to the currents outside. The ventilating-shaft F is preferably made to surround and incase the smoke-pipe A′, which is preferably carried up even with the shaft F. $G^1$ represents the door to the passage-way leading to the furnace or heater, and $G^2$ the door to the passage-way leading to the ash-pit. Both of these ways extend through the chambers.

The operation of the invention is as follows: Let the invention be arranged for heating and ventilating a railway-car or a single apartment. In such case it is placed in the car or apartment, and, preferably, upon the floor thereof, and as indicated in the drawing. Pure air from without the car or apartment is admitted, through the openings *a a* in the base, into the hot-air chamber inside the casing C. It is there warmed by coming near the heater, and, if preferred, vaporized in any suitable way. Then rising, the air is delivered through the openings E E into the car or apartment. At the same time, the ventilating-chamber *d* is also warmed from being in the immediate vicinity of the heater, and an upward current induced therein. In consequence, air is drawn from the apartment, through the perforations *d′ d′*, &c., into the ventilating-chamber, where it is heated and caused to rise into the shaft F, through which it is delivered to the open air outside the car or apartment.

It will be observed that the openings E E, for the delivery of the hot air into the apartment, are arranged in the upper part of the construction, and that the perforations *d′ d′*, &c., through which the air passes from the apartment, are at or near the bottom of the construction. This arrangement is desirable as it is in accordance with the laws of heat. The hot-air current, on entering the apartment, directly seeks the highest level, and this, with the arrangement described, it is enabled to do without conflicting with the course of the air which has previously entered the apartment, and which is gradually becoming cooler and fouler, and, in consequence, is falling to the lower part of the room, whence it is continually, in its cooler and fouler condition, being withdrawn from the apartment, and at the lowest level thereof by reason of the location of the perforations *d′ d′*, &c.

By this means the apartment is not only easily, thoroughly, and constantly ventilated by virtue of this flow of pure air into and of foul air out of the apartment, but, owing to the constant circulation of the heated air after it has been delivered into the apartment, and to its being brought down to the floor, the apartment is heated rapidly and economically, and also more evenly; for I have ascertained that, in apartments heated by the above-described method, the difference in temperature between the higher and lower levels is much less than exists in apartments heated in the ordinary way. Another advantage accrues from inclosing the hot-air chamber in the ventilating-chamber—viz., in the immediate vicinity of the heater a person is not unduly exposed to the heat, as with the ordinary heater. The outer casing and ascending cooler current in the ventilating-chamber operate as a screen; and the objectionable heat referred to is utilized in warming the ventilating-chamber. It is also desirable to have the shaft leading from the ventilating-chamber arranged to surround the escape-pipe of the heater. The escape-pipe is kept warmer, and the draft of the heater in consequence promoted. By means of the dampers *e e* in the pipes E E the discharge of the hot air into the apartment or building can be regulated, and even entirely cut off, without, however, in the least degree checking the ventilation.

Having described my invention, what I claim is—

1. The combination of the base B, heater A, and casing C, the base having the central opening *a* communicating with the outer air, and with the chamber formed between the heater A and casing C, this chamber being provided with apertures discharging into the car and into the ventilating shaft or chamber, the discharge being regulated and controlled by dampers, as described.

2. The combination of the base B, provided with openings *d′*, with the chamber between the casings C and D, and the ventilator-shaft, by which means impure air is drawn from the room and discharged into the open air, as described.

3. The combination of the base B, rims *b b′*, openings *a a*, orifices *d′ d′*, &c., casings C and D, tubes or pipes E E, dampers *e e*, ventilating-shaft F, when arranged to operate as and for the purpose set forth.

4. The combination of a heater or furnace, a hot-air chamber, and a ventilating-chamber, the two latter being in the vicinity at the level of the body of the former, and heated thereby, and the hot-air chamber receiving pure air from without the apartment, or building and delivering it, after being heated, into the apartment or building, and the ventilating-chamber receiving the foul or cooler air from the apartment or building, and delivering it outside the apartment or building.

5. The combination of a heater, a hot-air chamber, and a ventilating-chamber, the hot-air chamber delivering pure warm air into an apartment at a level above the lower part of the apartment, and the ventilating-chamber receiving impure or cooler air from the lower part of the apartment and delivering it outside the apartment.

6. The method, herein described, of heating an apartment evenly and rapidly by delivering hot air into the upper part of the apartment, and withdrawing the cooler air from the lower part of the apartment by means of a heater heating suitable chambers and generating air-currents therein, and which are, respectively, delivered and withdrawn in the directions named.

7. The combination of a heater and a ventilating-chamber, the latter being in the immediate vicinity, and at the level of the body of the heater, and warmed thereby, causing an ascending air-current therein for the purpose of ventilation.

8. The combination of a hot-air chamber and a ventilating-chamber, arranged at or about the same level, the latter being warmed, and an ascending air-current caused therein by heat given out by the former.

9. The combination of the heater A, ventilating-shaft F, ventilating-chamber *d*, and pipe A′, substantially as described.

10. The combination of a central heater, A, an annular hot-air chamber, and an outer ventilating-chamber, *d*, substantially as described.

11. The method herein described for heating and ventilating an apartment or building by delivering a current of pure warm air into the apartment or building, and by withdrawing a current of foul and cooler air from the apartment or building, said air-currents being induced and directed by means of a heater heating chambers in the vicinity and at the level of the body of the heater, and inducing ascending currents therein, and, respectively, in the directions described.

12. The combination of a heater, hot-air chamber, and ventilating chamber or shaft, substantially as described, and suitable dampers and openings, by which the hot air can be delivered into the apartment or building being warmed, or, if desired, into the ventilating chamber or shaft, substantially as and for the purpose set forth.

CHARLES F. WHORF.

Witnesses:

CHAS. D. MOODY,
SAML. S. BOYD.